United States Patent

Islip

[15] 3,671,650
[45] June 20, 1972

[54] CERTAIN 2-(HETEROCYCLIC ACYLIMINO)-5-NITRO-4-THIAZOLINE-3-ACETAMIDES

[72] Inventor: Peter John Islip, Hampton, England
[73] Assignee: Parke, Davis & Company, Detroit, Mich.
[22] Filed: May 14, 1970
[21] Appl. No.: 37,295

[30] Foreign Application Priority Data

June 18, 1969 Great Britain......................30,950/69

[52] U.S. Cl. ....................260/294.8 D, 260/306.7, 424/266, 424/270
[51] Int. Cl. ..........................................................C07d 31/50
[58] Field of Search ...............................260/294.8 D, 306.7

[56] References Cited

UNITED STATES PATENTS 3,499,907  3/1970  Islip....................................260/306.7
3,523,122  8/1970  Capps..................................260/306.7

Primary Examiner—Alan L. Rotman
Attorney—Robert R. Adams, David B. Ehrlinger, George M. Richards and Edward J. Gall

[57] ABSTRACT

5-Nitro-4-thiazoline-3-acetamide compounds having the formula

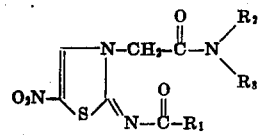

and salts thereof; where $R_1$ is 2-furyl, 2-thienyl, 2-pyridyl, 3-pyridyl, or 4-pyridyl, and each of $R_2$ and $R_3$ is hydrogen or an alkyl radical containing not more than three carbon atoms. The compounds are produced by reacting a 5-nitrothiazole with an α-haloacetamide and are useful as schistosomacides and trichomonacides.

8 Claims, No Drawings

CERTAIN 2-(HETEROCYCLIC ACYLIMINO)-5-NITRO-4-THIAZOLINE-3-ACETAMIDES

SUMMARY AND DETAILED DESCRIPTION

The present invention relates to new heterocyclic compounds that are useful as chemotherapeutic agents and to methods for their production. More particularly, the invention relates to new 5-nitro-4-thiazoline-3-acetamide compounds having the formula

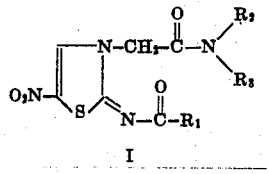

I and to pharmaceutically-acceptable salts thereof; where $R_1$ is 2-furyl, 2-thienyl, 2-pyridyl, 3-pyridyl, or 4-pyridyl, and each of $R_2$ and $R_3$ is hydrogen or an alkyl radical containing not more than three carbon atoms.

In accordance with the invention, compounds having formula I are produced by reacting a 5-nitrothiazole compound having the formula

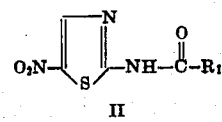

II with an α-haloacetamide compound having the formula

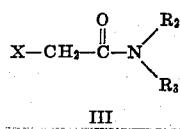

III in the presence of a base; where $R_1$, $R_2$, and $R_3$ have the aforementioned significance, and X is chlorine, bromine, or iodine, preferably bromine. Bases that may be used in the reaction include alkali metal hydrides, alkali metal amides, and alkali metal alkoxides. The preferred base is an alkali metal hydride, especially sodium hydride. The reaction is best carried out in an unreactive solvent medium. With the preferred alkali metal hydride base, any of a number of anhydrous, non-hydroxylic solvents may be used, including ethers, such as diethyl ether, dioxane, and tetrahydrofuran; aromatic hydrocarbons, such as benzene and toluene; tertiary amides, such as N,N-dimethylformamide and N-methyl-2-pyrrolidinone; and dimethyl sulfoxide; as well as mixtures of these. A preferred solvent is N,N-dimethylformamide. The temperature and duration of the reaction are not critical and may be varied over a wide range, the temperature from 0° C to 100° C. and the duration from about 10 minutes to about 24 hours. In the preferred method for carrying out the reaction, the 5-nitrothiazole compound of formula II and the base are first mixed together in the chosen solvent, the α-haloacetamide of formula III is then added, and the resulting reaction mixture is stirred for a period of from about 30 minutes to about 3 hours at a temperature in the range of 15° C to 50° C. Equimolar quantities of reactants and base are normally employed, although a slight excess of any one is not harmful. To insure completeness of reaction, it may be desirable to use a slight excess of both the α-haloacetamide and the base.

The α-haloacetamide compounds used as starting materials in the foregoing process can in general be prepared by reacting an α-haloacetyl halide compound having the formula

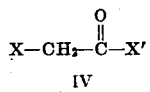

IV with an amine compound having the formula

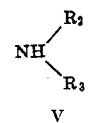

V where each of $R_2$, $R_3$, and X is as defined earlier, and X' is chlorine or bromine. The preparation of the hitherto unknown starting compounds of formula II is described in detail hereinafter.

The compounds of the invention having formula I, wherein $R_1$ is 2—, 3—, or 4-pyridyl, can exist in the free base form or in the form of an acid-addition salt. Pharmaceutically-acceptable acid-addition salts can be obtained by reacting the chosen pyridyl-substituted compound in free base form with any of a variety of acids, including hydrochloric, hydrobromic, hydriodic, nitric, sulfuric, phosphoric, sulfamic, acetic, benzenesulfonic, succinic, maleic, and citric acids. The acid-addition salts and free bases are interconvertible by adjustment of the pH. They differ in certain physical properties, such as solubility, but, in general, are otherwise equivalent for purposes of the invention.

The compounds of the invention are new chemical compounds that are useful as chemotherapeutic agents, especially as antiparasitic agents that are active schistosomacides and trichomonacides. Their activities can be demonstrated and quantitatively measured in standard tests against Schistosoma mansoni and Trichomonas vaginalis.

In the test used to determine schistosomacidal activity, female Stout mice weighing 13–15 grams each are infected intraperitoneally with 75 S. mansoni (Puerto Rican strain) cercariae (from the snail host Australorbis glabratus) six weeks prior to treatment. The experimental groups usually consist of five to 10 mice, while the sham-dosed control groups number 10 to 15 mice per experiment. All of the mice are fed Rockland mouse food from the time of infection to autopsy. The test compounds are administered in the diet or by gavage. Following treatment for a measured period, the animals are killed and autopsied, and the activity of the test compound is evaluated primarily on the basis of the distribution and number of living and dead worms in the liver, portal veins, and mesenteric veins. This activity is then expressed in terms of the percentage of schistosomes found killed after the period of treatment at a given dosage level, which is expressed either as a percentage of the diet or in mg./kg./day when administration is by gavage. The activities of some representative compounds of the present invention, as determined by this test procedure, are shown in the table that follows. The compounds in the table are identified by reference to formula I.

SCHISTOSOMACIDAL ACTIVITY

| | Compound | | % Schistosomes Dead at % Mouse Diet for Number of Days |
|---|---|---|---|
| $R_1$ | $R_2$ | $R_3$ | |
| 2-furyl | $CH_3$ | $CH_3$ | 95/0.25/14 |
| 2-furyl | $C_2H_5$ | $C_2H_5$ | 93/0.25/14 |
| 4-pyridyl | $C_2H_5$ | $C_2H_5$ | 72/0.25/7 |
| | | | 72/0.0625/7 |
| 2-thienyl | $CH_3$ | $CH_3$ | 100/0.25/14 |
| 2-thienyl | $C_2H_5$ | $C_2H_5$ | 86/0.25/7 |
| | | | 86/0.125/7 |

The test used to determine trichomonacidal activity is an in vitro test against Trichomonas vaginalis. In this test, Kupferberg's medium, containing 250 γ/ml. of sodium penicillin G and streptomycin sulfate, is inoculated with a sufficient number of organisms from a 24-hour Kupferberg culture to give 10,000 trichomonades/ml. The resulting mixture (4.5 ml.) is then added to 0.5 ml. of a solution or suspension of a measured quantity of the test compound in aqueous ethanol in screw-capped tubes, and the tubes are incubated at 37.0° C.

for 48 hours. Varied concentrations of the test compound are obtained by serial dilution. After incubation, the effect of the test compound is determined by microscopic examination of 0.02 ml. of the test preparation dispersed under a 22 × 22 mm. coverslip. The number of viable trichomonads per Howard disc field is recorded, with at least 10 fields being counted. The test preparations are also compared with control tubes to which no test compound is added. The test compound is rated as follows, according to the percentage of suppression of the number of viable organisms; cidal – 100%; static– 90 to 99.9 percent; suppressive – 50 to 89.9 percent; inactive – less than 50 percent. The trichomonacidal activities of some representative compounds of the present invention, as determined by the foregoing test procedure, are shown in the following table, where the compounds are again identified by reference to formula I.

TRICHOMONACIDAL ACTIVITY

| Compound | | | |
|---|---|---|---|
| $R_1$ | $R_2$ | $R_3$ | Rating (dosage, Y/ml.) |
| 2-furyl | $CH_3$ | $CH_3$ | cidal (6.25) |
| | | | static (1.56) |
| 2-furyl | $C_2H_5$ | $C_2H_5$ | suppressive (6.25) |
| 4-pyridyl | $C_2H_5$ | $C_2H_5$ | cidal (6.25) |
| 2-thienyl | $CH_3$ | $CH_3$ | cidal (25) |
| | | | static (6.25) |
| 2-thienyl | $C_2H_5$ | $C_2H_5$ | cidal (25) |

The invention is illustrated by the following examples.

Example 1

To a stirred solution of 12.0 g. of N-(5-nitro-2-thia-zolyl)-2-furamide in 140 ml. of N,N-dimethylformamide is added in portions 2.4 g. of a 50 percent sodium hydride in mineral oil dispersion. 2-Bromoacetamide (6.9 g.) is added next, and the resulting mixture is stirred at 20-25° C. for one hour and then diluted with 100 ml. of water. The solid 2-(2-furoylimino)-5-nitro-4-thiazoline-3-acetamide that precipitates is isolated, washed with water and with ether, and dried; m.p. 266° C., following crystallization from acetic acid.

In the foregoing procedure, the same product is obtained when 4.7 g. of 2-chloroacetamide is substituted for the 2-bromo-acetamide.

Example 2

To a stirred mixture consisting of 6.0 g. of N-(5-nitro-2-thiazolyl)isonicotinamide, 0.98 g. of a 59 percent sodium hydride in mineral oil dispersion, and 100 ml. of N,N-dimethylformamide is added 7.0 g. of 2-bromo-N,N-dipropylacetamide, and the reaction mixture is stirred at 20-25° C. for one hour. It is then diluted with an equal volume of water, the aqueous mixture is extracted with ethyl acetate, and the ethyl acetate extract is dried and evaporated to give a solid residue of N-{3-[(di-propylcarbamoyl)methyl]-5-nitro-4-thiazolin-2-ylidene}-isonicotinamide; m.p. 188–190° C., following crystallization from 96 percent ethanol.

The N-(5-nitro-2-thiazolyl)isonicotinamide starting material is obtained as follows. To a stirred solution of 3.45 g. of 2-amino-5-nitrothiazole in 35 ml. of pyridine at 0° C. is added in portions 5.29 g. of freshly prepared isonicotinyl chloride hydrochloride and then 20 ml. of acetone. The resulting mixture is stirred for 2 hours at 20–25° C. and diluted with an equal volume of water, and the solid N-(5-nitro-2-thiazolyl)isonicotinamide that precipitates is isolated, washed with water, and dried; m.p. 250–251° C. (with decomposition), following crystallization from ethyl acetate.

Example 3

Utilizing the general procedure described in Examples 1 and 2 above, the following 5-nitro-4-thiazoline-3-acetamide compounds are obtained from the designated reactants:

a. 2-(2-Furoylimino)-N,N-dimethyl-5-nitro-4-thiazoline-3-acetamide, m.p. 218.5–220° C. (crystallization from acetic acid); from 12.0 g. of N-(5-nitro-2-thiazoyl)-2-furamide, 2.1 g. of a 58 percent sodium hydride in mineral oil dispersion, and 9.3 g. of 2-bromo-N,N-dimethylacetamide.

b. N,N-Diethyl-2-(2-furoylimino)-5-nitro-4-thiazoline-3-acetamide, m.p. 217–220° C. (acetic acid); from 12.0 g. of N-(5-nitro-2-thiazoyl)-2-furamide, 2.4 g. of a 50 percent sodium hydride in mineral oil dispersion, and 9.7 g. of 2-bromo-N,N-diethylacetamide.

c. 2-(2-Furoylimino)-5-nitro-N,N-dipropyl-4-thiazoline-3-acetamide, m.p. 187–190° C. (acetic acid); from 12.0 g. of N-(5-nitro-2-thiazolyl)-2-furamide, 2.4 g. of a 50 percent sodium hydride in mineral oil dispersion, and 11.1 g. of 2-bromo-N,N-dipropylacetamide.

d. N-{3-[(Diethylcarbamoyl)methyl]-5-nitro-4-thiazolin-2-ylidene}isonicotinamide, m.p. 194–196° C., following successive crystallizations from ethyl acetate, acetic acid, and 96 percent ethanol; from 6.0 g. of N-(5-nitro-2-thiazolyl)isonicotinamide, 1.15 g. of a 50 percent sodium hydride in mineral oil dispersion, and 5.6 g. of 2-bromo-N,N-diethylacetamide.

e. 5-Nitro-2-(2-thenoylimino)-4-thiazoline-3-acetamide, m.p. 270–271° C. (methanol); from 25.5 g. of N-(5-nitro-2-thiazolyl)-2-thiophenecarboxamide, 3.81 g. of a 63 percent sodium hydride in mineral oil dispersion, and 14.5 g. of 2-bromoacetamide.

f. N,N-Dimethyl-5-nitro-2-(2-thenoylimino)-4-thiazo-line-3-acetamide, m.p. 250–251° C. (96 percent ethanol); from 12.8 g. of N-(5-nitro-2-thiazolyl)-2-thiophenecarboxamide, 2.05 g. of a 58 percent sodium hydride in mineral oil dispersion, and 9.0 g. of 2-bromo-N,N-dimethylacetamide.

g. N,N-Diethyl-5-nitro-2-(2-thenoylimino)-4-thiazoline-3-acetamide, m.p. 201–202° C. (96 percent ethanol); from 12.8 g. of N-(5-nitro-2thiazolyl)-2-thiophenecarboxamide, 2.05 g. of a 58 percent sodium hydride in mineral oil dispersion, and 10.0 g. of 2-bromo-N,N-diethylacetamide.

h. 5-Nitro-N,N-dipropyl-2-(2-thenoylimino)-4-thiazo-line-3-acetamide, m.p. 194–195° C. (96 percent ethanol); from 10.7 g. of N-(5-nitro-2-thiazolyl)-2-thiophenecarboxamide, 1.71 g. of a 58 percent sodium hydride in mineral oil dispersion, and 10.0 g. of 2-bromo-N,N-dipropylacetamide.

i. N-{3-[(Dimethylcarbamoyl)methyl]-5-nitro-4-thiazolin-2-ylidene}isonicotinamide, m.p. 243–245° C. (with decomposition; crystallization from ethanol); from 6.0 g. of N-(5-nitro-2-thiazolyl)isonicotinamide, 1.15 g. of a 50 percent sodium hydride in mineral oil dispersion, and 4.7 g. of 2-bromo-N,N-dimethylacetamide.

The sulfamate salt of N-{3-[(dimethylcarbamoyl)-methyl]-5-nitro-4-thiazolin-2-ylidene}isonicotinamide is obtained by mixing warm methanolic solutions of 2.0 g. of the free base and 0.58 g. of sulfamic acid, chilling the resulting mixture, and isolating and drying the solid crystalline salt that is obtained; m.p. 216–221° C. (with decomposition). The sulfate salt, m.p. 240–242°C., is obtained in a similar manner by reacting equivalent quantities of the free base and sulfuric acid.

j. N-{3-[(Dimethylcarbamoyl)methyl]-5-nitro-4-thiazolin-2-ylidene}nicotinamide, m.p. 246-247° C. (with decomposition), following successive crystallizations from aqueous dimethylformamide and acetic acid; from 40.0 g. of N-(5-nitro-2-thiazolyl)nicotinamide, 5.86 g. of a 66 percent sodium hydride in mineral oil dispersion, and 29.0 g. of 2-bromo-N,N-dimethyl-acetamide.

k. N-{3-[(Dimethylcarbamoyl)methyl]-5-nitro-4-thiazolin-2-ylidene}picolinamide, m.p. 234–236° C. (with decomposition); from 40.0 g. of N-(5-nitro-2-thiazolyl)picolinamide, 5.86 g. of a 66 percent sodium hydride in mineral oil dispersion, and 30.0 g. of 2-bromo-N,N-dimethylacetamide.

The N-(5-nitro-2-thiazolyl)picolinamide starting material is obtained as follows. To a suspension of 98.4 g. of picolinic acid in 300 ml. of toluene is added 86.0 g. of thionyl chloride, and the resulting mixture is heated under reflux for 2.5 hours. Upon cooling, the solution is evaporated under reduced pressure, and the oily residue obtained is added immediately to a stirred suspension of 87.0 g. of 2-amino-5-nitrothiazole in 500 ml. of pyridine at such a rate so that the temperature of the reaction mixture is kept below 35° C. The mixture is then stirred for 2 hours at room temperature and poured into water to give a solid precipitate of N-(5-nitro-2-thiazolyl)picolinamide, which is isolated and dried; m.p. 268–274° C. (with decomposition).

I claim

1. A member of the class consisting of 5-nitro-4-thiazoline-3-acetamide compounds having the formula

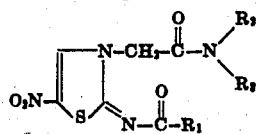

and pharmaceutically-acceptable acid-addition salts thereof; where $R_1$ is a member of the class consisting of 2-furyl, 2-thienyl, 2-pyridyl, 3-pyridyl, and 4-pyridyl, and each of $R_2$ and $R_3$ is a member of the class consisting of hydrogen and an alkyl radical containing not more than three carbon atoms.

2. A compound according to claim 1 which is 2-(2-furoylimino)-N,N-dimethyl-5-nitro-4-thiazoline-3-acetamide.

3. A compound according to claim 1 which is N,N-diethyl-2-(2-furoylimino)-5-nitro-4-thiazoline-3-acetamide.

4. A compound according to claim 1 which is N-{3-[(diethylcarbamoyl)methyl]-5-nitro-4-thiazolin-2-ylidene}-isonicotinamide.

5. A compound according to claim 1 which is N,N-dimethyl-5-nitro-2-(2-thenoylimino)-4-thiazoline-3-acetamide.

6. A compound according to claim 1 which is N,N-diethyl-5-nitro-2-(2-thenoylimino)-4-thiazoline-3-acetamide.

7. A compound according to claim 1 which is N-{3[(dimethylcarbamoyl)methyl]-5-nitro-4-thiazolin-2-ylidene}-isonicotinamide.

8. A compound according to claim 1 which is a pharmaceutically-acceptable acid-addition salt of N-{3-[(dimethylcarbamoyl)methyl]-5-nitro-4thiazolin-2-ylidene}-isonicotinamide.

* * * * *